US006553665B2

(12) United States Patent
Gunn et al.

(10) Patent No.: US 6,553,665 B2
(45) Date of Patent: *Apr. 29, 2003

(54) STATOR VANE ASSEMBLY FOR A TURBINE AND METHOD FOR FORMING THE ASSEMBLY

(75) Inventors: George Gerald Gunn, Landrum; John Robert Fulton, Simpsonville, both of SC (US); Francis Lawrence Kirkpatrick, deceased, late of Galway, NY (US), by Barbara Tomczak, legal representative; Raymond Joseph Jones, Oxford, MA (US)

(73) Assignee: General Electric Company, Schenectady, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/520,459

(22) Filed: Mar. 8, 2000

(65) Prior Publication Data

US 2002/0028139 A1 Mar. 7, 2002

(51) Int. Cl.$^7$ ............................................. B21K 25/00
(52) U.S. Cl. ................................. 29/889.21; 415/209.4
(58) Field of Search ......................... 29/889.21, 889.22; 415/209.4; 416/191

(56) References Cited

U.S. PATENT DOCUMENTS

| 2,242,308 A | * | 5/1941 | Kroon ................. 29/889.21 X |
| 2,450,493 A | * | 10/1948 | Strub ................. 29/889.21 X |
| 3,182,955 A | * | 5/1965 | Hyde ................. 29/889.21 X |
| 3,617,685 A | * | 11/1971 | Brill-Edwards et al. ...................... 219/121.14 |
| 3,751,182 A | * | 8/1973 | Brown ........................ 416/191 |
| 3,932,056 A | * | 1/1976 | Tai ........................... 415/209.4 |
| 4,026,659 A | * | 5/1977 | Freeman, Jr. ............... 415/115 |
| 4,176,433 A | * | 12/1979 | Lee et al. ................... 29/889.1 |
| 4,177,011 A | * | 12/1979 | Eskesen et al. ............. 416/191 |
| 4,305,697 A | * | 12/1981 | Cohen et al. ............... 29/889.1 |
| 4,543,039 A | * | 9/1985 | Ruis et al. .................. 415/190 |
| 4,812,107 A |   | 3/1989 | Barcella et al. ............. 416/191 |
| 4,840,539 A | * | 6/1989 | Bourcier et al. ............ 416/191 |
| 5,022,818 A | * | 6/1991 | Scalzo ..................... 415/209.3 |

(List continued on next page.)

FOREIGN PATENT DOCUMENTS

| EP | 0575742 | 12/1993 |
| EP | 0604754 | 7/1994 |
| JP | 9168273 | 6/1997 |

OTHER PUBLICATIONS

"39$^{th}$ GE Turbine State–of–the–Art Technology Seminar", Tab 1, ""F" Technology –the First Half–Million Operating Hours", H.E. Miller, Aug. 1996.

(List continued on next page.)

Primary Examiner—Edward K. Look
Assistant Examiner—Richard A. Edgar
(74) Attorney, Agent, or Firm—Nixon & Vanderhye

(57) ABSTRACT

Turbine vane segments having outer and inner bands and a vane extending therebetween are welded one to the other by E-beam welding along their adjoining margins and from the outside of the bands. The adjoining margins on the hot gas path sides of the outer and inner bands are chamfered, TIG-welded and machined to provide a smooth, continuous gas path surface. The aft hook of each segment is cut back to provide inset faces in a radially projecting flange and a flange extending axially from the radial flange. A filler piece having a body shaped to correspond to the shape of the space between the inset faces of the radial flange is E-beam welded to the radial flange. Gaps between a tongue on the filler piece and the inset faces of the axially extending flange are provided with weld filler material and TIG-welded to complete the welding of the aft hook.

7 Claims, 5 Drawing Sheets

U.S. PATENT DOCUMENTS

| | | | | |
|---|---|---|---|---|
| 5,197,856 A | * | 3/1993 | Koertge et al. | 415/209.3 |
| 5,390,413 A | * | 2/1995 | Pratt | 29/889.21 |
| 5,414,929 A | | 5/1995 | Flöser et al. | |
| 5,636,439 A | * | 6/1997 | Cunha et al. | 29/889.22 |
| 6,131,800 A | * | 10/2000 | Fernihough et al. | 29/889.21 X |
| 6,152,694 A | * | 11/2000 | Ai | 416/191 X |

OTHER PUBLICATIONS

"39th GE Turbine State–of–the–Art Technology Seminar", Tab 2, "GE Heavy–Duty Gas Turbine Performance Characteristics", F. J. Brooks, Aug. 1996.

"39th GE Turbine State–of–the–Art Technology Seminar", Tab 3, "9EC 50Hz 170–MW Class Gas Turbine", A. S. Arrao, Aug. 1996.

"39th GE Turbine State–of–the–Art Technology Seminar", Tab 4, "MWS6001FA –An Advanced–Technology 70–MW Class 50/60 Hz Gas Turbine", Ramachandran et al., Aug. 1996.

"39th GE Turbine State–of–the–Art Technology Seminar", Tab 5, "Turbomachinery Technology Advances at Nuovo Pignone", Benvenuti et al., Aug. 1996.

"39th GE Turbine State–of–the–Art Technology Seminar", Tab 6, "GE Aeroderivative Gas Turbines –Design and Operating Features", M.W. Horner, Aug. 1996.

"39th GE Turbine State–of–the–Art Technology Seminar", Tab 7, "Advance Gas Turbine Materials and Coatings", P.W. Schilke, Aug. 1996.

"39th GE Turbine State–of–the–Art Technology Seminar", Tab 8, "Dry Low $NO_x$ Combustion Systems for GE Heavy––Duty Turbines", L. B. Davis, Aug. 1996.

"39th GE Turbine State–of–the–Art Technology Seminar", Tab 9, "GE Gas Turbine Combustion Flexibility", M. A. Davi, Aug. 1996.

"39th GE Turbine State–of–the–Art Technology Seminar", Tab 10, "Gas Fuel Clean–Up System Design Considerations for GE Heavy–Duty Gas Turbines", C. Wilkes, Aug. 1996.

"39th GE Turbine State–of–the–Art Technology Seminar", Tab 11, "Integrated Control Systems for Advanced Combined Cycles", Chu et al., Aug. 1996.

"39th GE Turbine State–of–the–Art Technology Seminar", Tab 12, "Power Systems for the 21st Century "H" Gas Turbine Combined Cycles", Paul et al., Aug. 1996.

"39th GE Turbine State–of–the–Art Technology Seminar", Tab 13, "Clean Coal and Heavy Oil Technologies for Gas Turbines", D. M. Todd, Aug. 1996.

"39th GE Turbine State–of–the–Art Technology Seminar", Tab 14, "Gas Turbine Conversions, Modifications and Uprates Technology", Stuck et al., Aug. 1996.

"39th GE Turbine State–of–the–Art Technology Seminar", Tab 15, "Performance and Reliability Improvements for Heavy–Duty Gas Turbines, " J. R. Johnston, Aug. 1996.

"39th GE Turbine State–of–the–Art Technology Seminar", Tab 16, "Gas Turbine Repair Technology", Crimi et al, Aug. 1996.

"39th GE Turbine State–of–the–Art Technology Seminar", Tab 17, "Heavy Duty Turbine Operating & Maintenance Considerations", R. F. Hoeft, Aug. 1996.

"39th GE Turbine State–of–the–Art Technology Seminar", Tab 18, "Gas Turbine Performance Monitoring and Testing", Schmitt et al., Aug. 1996.

"39th GE Turbine State–of–the–Art Technology Seminar", Tab 19, "Monitoring Service Delivery System and Diagnostics", Madej et al., Aug. 1996.

"39th GE Turbine State–of–the–Art Technology Seminar", Tab 20, "Steam Turbines for Large Power Applications", Reinker et al., Aug. 1996.

"39th GE Turbine State–of–the–Art Technology Seminar", Tab 21, "Steam Turbines for Ultrasupercritical Power Plants", Retzlaff et al., Aug. 1996.

"39th GE Turbine State–of–the–Art Technology Seminar", Tab 22, "Steam Turbine Sustained Efficiency", P. Schofield, Aug. 1996.

"39th GE Turbine State–of–the–Art Technology Seminar", Tab 23, "Recent Advances in Steam Turbines for Industrial and Cogeneration Applications", Leger et al., Aug. 1996.

"39th GE Turbine State–of–the–Art Technology Seminar", Tab 24, "Mechanical Drive Steam Turbines", D. R. Leger, Aug. 1996.

"39th GE Turbine State–of–the–Art Technology Seminar", Tab 25, "Steam Turbines for STAG™Combined–Cycle Power Systems", M. Boss, Aug. 1996.

"39th GE Turbine State–of–the–Art Technology Seminar", Tab 26, "Cogeneration Application Considerations", Fisk et al., Aug. 1996.

"39th GE Turbine State–of–the–Art Technology Seminar", Tab 27, "Performance and Economic Considerations of Repowering Steam Power Plants", Stoll et al., Aug. 1996.

"39th GE Turbine State–of–the–Art Technology Seminar", Tab 28, "High–Power –Density ™ Steam Turbine Design Evolution", J. H. Moore, Aug. 1996.

"39th GE Turbine State–of–the–Art Technology Seminar", Tab 29, "Advances in Steam Path Technologies", Cofer, IV, et al., Aug. 1996.

"39th GE Turbine State–of–the–Art Technology Seminar", Tab 30, "Upgradable Opportunities for Steam Turbines", D. R. Dreier, Jr., Aug. 1996.

"39th GE Turbine State–of–the–Art Technology Seminar", Tab 31, "Uprate Options for Industrial Turbines", R. C. Beck, Aug. 1996.

"39th GE Turbine State–of–the–Art Technology Seminar", Tab 32, "Thermal Performance Evaluation and ssessment of Steam Turbine Units", P. Albert, Aug. 1996.

"39th GE Turbine State–of–the–Art Technology Seminar", Tab 33, "Advances in Welding Repair Technology", J. F. Nolan, Aug. 1996.

"39th GE Turbine State–of–the–Art Technology Seminar", Tab 34, "Operation and Maintenance Strategies to Enhance Plant Profitability", MacGillivray et al., Aug. 1996.

"39th GE Turbine State–of–the–Art Technology Seminar", Tab 35, "Generator Insitu Inspections", D. Stanton.

"39th GE Turbine State–of–the–Art Technology Seminar", Tab 36, "Generator Upgrade and Rewind", Halpern et al., Aug. 1996.

"39th GE Turbine State–of–the–Art Technology Seminar", Tab 37, "GE Combined Cycle Product Line and Performance", Chase, et al., Aug. 1996.

"39th GE Turbine State–of–the–Art Technology Seminar", Tab 38, "GE Combined Cycle Experience", Maslak et al., Aug. 1996.

"39th GE Turbine State–of–the–Art Technology Seminar", Tab 39, "Single–Shaft Combined Cycle Power Generation Systems", Tomlinson et al., Aug. 1996.

"Advanced Turbine System Program –Conceptual Design and Product Development", Annual Report, Sep. 1, 1994 Aug. 31, 1995.

"Advanced Turbine Systems (ATS Program) Conceptual Design and Product Development", Final Technical Progress Report, Vol. 2–Industrial Machine, Mar. 31, 1997, Morgantown, WV.
"Advanced Turbine Systems (ATS Program), Conceptual Design and Product Development", Final Technical Progress Report, Aug. 31, 1996, Morgantown, WV.
"Advanced Turbine Systems (ATS) Program, Phase 2, Conceptual Design and Product Development", Yearly Technical Progress Report, Reporting Period: Aug. 25, 1993–Aug. 31, 1994.
"Advanced Turbine Systems" Annual Program Review, Preprints, Nov. 2–4, 1998, Washington, D.C. U.S. Department of Energy, Office of Industrial Technologies Federal Energy Technology Center.
"ATS Conference" Oct. 28, 1999, Slide Presentation.
"Baglan Bay Launch Site", various articles relating to Baglan Energy Park.
"Baglan Energy Park", Brochure.
"Commercialization", Del Williamson, Present, Global Sales, May 8, 1998.
"Environmental, Health and Safety Assessment: ATS 7H Program (Phase 3R) Test Activities at the GE Power Systems Gas Turbine Manufacturing Facility, Greenville, SC", Document #1753, Feb. 1998, Publication Date: Nov. 17, 1998, Report Nos. DE–FC21–95MC31176—11.
"Exhibit panels used at 1995 product introduction at PowerGen Europe".
"Extensive Testing Program Validates High Efficiency, reliability of GE's Advanced "H" Gas Turbine Technology", Press Information, Press Release, 96–NR14, Jun. 26, 1996, H Technology Tests/pp. 1–4.
"Extensive Testing Program Validates High Efficiency, Reliability of GE's Advanced "H" Gas Turbine Technology", GE Introduces Advanced Gas Turbine Technology Platform: First ot Reach 60% Combined–Cycle Power Plant Efficiency, Press Information, Press Release, Power–Gen Europe '95, 95–NRR15, Advanced Technology Introduction/pp. 1–6.
"Gas, Steam Turbine Work as Single Unit in GE's Advanced H Technology Combined–Cycle System", Press Information, Press Release, 95–NR18, May 16, 1995, Advanced Technology Introduction/pp. 1–3.
"GE Breaks 60% Net Efficiency Barrier" paper, 4 pages.
"GE Business Share Technologies and Experts to Develop State–of–the–Art Products", Press Information, Press Release 95–NR10, May 16, 1995, GE Technology Transfer/pp. 1–3.
"General Electric ATS Program Technical Review, Phase 2 Activities", T. Chance et al., pp. 1–4.
"General Electric's DOE/ATS H Gas Turbine Development" Advanced Turbine Systems Annual Review Meeting, Nov. 7–8, 1996, Washington, D.C., Publication Release.
"H Technology Commercialization", 1998 MarComm Activity Recommendation, Mar., 1998.
"H Technology", Jon Ebacher, VP, Power Gen Technology, May 8, 1998.
"H Testing Process", Jon Ebacher, VP, Power Gen Technology, May 8, 1998.
"Heavy–Duty & Aeroderivative Products", Gas Turbines, Brochure, 1998.
"MS7001H/MS9001H Gas Turbine, gepower.com website for PowerGen Europe", Jun. 1–3 going public Jun. 15, (1995).

"New Steam Cooling System is a Key 60% Efficiency For GE "H"Technology Combined–Cycle Systems", Press Information, Press Release, 95–NRR16, May, 16, 1995, H Technology/pp. 1–3.
"Overview of GE's H Gas Turbine Combined Cycle", Jul. 1, 1995 to Dec. 31, 1997.
"Power Systems for the $21^{st}$ Century –"H" Gas Turbine Combined Cycles", Thomas C. Paul et al., Report.
"Power–Gen '96 Europe", Conference Programme, Budapest, Hungary, Jun. 26–28, 1996.
"Power–Gen International", 1998 Show Guide, Dec. 9–11, 1998, Orange County Convention Center, Orlando, Florida.
"Press Coverage following 1995 product announcement"; various newspaper clippings relating to improved generator.
"Proceedings of the Advanced Turbine Systems Annual Program Review Meeting", vol. I, "Industrial Advanced Turbine Systems Program Overview", D.W. Esbeck, pp. 3–13, Oct. 1995.
"Proceedings of the Advanced Turbine Systems Annual Program Review Meeting", vol. I, "H Gas Turbine combined Cycle", J. Corman, pp. 14–21, Oct., 1995.
"Proceedings of the Advanced Turbine Systems Annual Program Review Meeting", vol. I, "Overview of Westinghouse's Advanced Turbine Systems Program", Bannister et al., pp. 22–30, Oct. 1995.
"Proceedings of the Advanced Turbine Systems Annual Program Review Meeting", vol. I, "Allison Engine ATS Program Technical Review", D. Mukavetz, pp. 31–42, Oct., 1995.
"Proceedings of the Advanced Turbine Systems Annual Program Review Meeting", vol. I, "Advanced Turbine Systems Program Industrial System Concept Development", S. Gates, pp. 43–63, Oct. 1995.
"Proceedings of the Advanced Turbine Systems Annual Program Review Meeting", vol. I, "General Electric ATS Program Technical Review Phase 2 Activities", Chance et al., pp. 70–74, Oct. 1995.
"Proceedings of the Advanced Turbine Systems Annual Program Review Meeting", vol. I, "Technical Review of Westinghouse's Advanced Turbine Systems Program", Diakunchak et al., pp. 75–86, Oct., 1995.
"Proceedings of the Advanced Turbine Systems Annual Program Review Meeting", vol. I, "Advanced Combustion Turbines and Cycles: An EPRI Perspective", Touchton et al., pp. 87–88, Oct., 1995.
"Proceedings of the Advanced Turbine Systems Annual Program Review Meeting", vol. 1, "Advanced Turbine System Program Phase 2 Cycle Selection", Latcovich, Jr., pp. 64–69, Oct. 1995.
"Proceedings of the Advanced Turbine Systems Annual Program Review Meeting", vol. I, "Advanced Turbine Systems Annual Program Review", William E. Koop, pp. 89–92, Oct.. 1995.
"Proceedings of the Advanced Turbine Systems Annual Program Review Meeting", vol. I, "The AGTSR Consortium: An Update", Fant et al., pp. 93–102, Oct., 1995.
"Proceedings of the Advanced Turbine Systems Annual Program Review Meeting", vol. I, "Overview of Allison/AGTSR Interactions", Sy A. Ali, pp. 103–106, Oct. 1995.
"Proceedings of the Advanced Turbine Systems Annual Program Review Meeting", vol. I, "Design Factors for Stable Lean Premix Combustion", Richards et al., pp. 107–113, Oct., 1995.

"Proceedings of the Advanced Turbine Systems Annual Program Review Meeting", vol. I, "Ceramic Stationary as Turbine", M. van Roode, pp. 114–147, Oct.,1995.

"Proceedings of the Advanced Turbine Systems Annual Program Review Meeting", vol. I, "DOE/Allison Ceramic Vane Effort", Wenglarz et al., pp. 148–151, Oct., 1995.

"Proceedings of the Advanced Turbine Systems Annual Program Review Meeting", vol. I, "Materials/Manufacturing Element of the Advanced Turbine Systems Program", Karnitz et al., pp. 152–160, Oct., 1995.

"Proceedings of the Advanced Turbine Systems Annual Program Review Meeting", vol. I, "Land–Based Turbine Casting Initiative", Mueller et al., pp. 161–170, Oct., 1995.

"Proceedings of the Advanced Turbine Systems Annual Program Review Meeting", vol. I, "Turbine Airfoil Manufacturing Technology", Kortovich, pp. 171–181, Oct., 1995.

"Proceedings of the Advanced Turbine Systems Annual Program Review Meeting", vol. I, "Pratt & Whitney Thermal Barrier Coatings", Bornstein et al., pp. 182–193, Oct., 1995.

"Proceedings of the Advanced Turbine Systems Annual Program Review Meeting", vol. I, "Westinghouse Thermal Barrier Coatings", Goedjen et al., pp. 194–199, Oct., 1995.

"Proceedings of the Advanced Turbine Systems Annual Program Review Meeting", vol. I, "High Performance Steam Development", Duffy et al., pp. 200–220, Oct., 1995.

"Proceedings of the Advanced Turbine Systems Annual Program Review Meeting", vol. II, "Lean Premixed Combustion Stabilized by Radiation Feedback and heterogeneous Catalysis", Dibble et al., pp. 221–232, Oct., 1995.

"Proceedings of the Advanced Turbine Systems Annual Program Review Meeting", vol. II, "Rayleigh/Raman/LIF Measurements in a Turbulent Lean Premixed Combustor", Nandula et al., pp. 233–248, Oct., 1995.

"Proceedings of the Advanced Turbine Systems Annual Program Review Meeting", vol. II, "Lean Premixed Flames ofr Low $No_x$ Combustors", Sojka et al., pp. 249–275, Oct., 1995.

"Proceedings of the Advanced Turbine Systems Annual Program Review Meeting", vol. II, "Functionally Gradient Materials for Thermal Barrier Coatings in Advanced Gas Turbine Systems", Banovic et al., pp. 276–280, Oct., 1995.

"Proceedings of the Advanced Turbine Systems Annual Program Review Meeting", vol. II, "Advanced Turbine Cooling, Heat Transfer, and Aerodynamic Studies", Han et al., pp. 281–309, Oct., 1995.

"Proceedings of the Advanced Turbine Systems Annual Program Review Meeting", vol. II, "Life Prediction of Advanced Materials for Gas Turbine Application", Zamrik et al., pp. 310–327, Oct., 1995.

"Proceedings of the Advanced Turbine Systems Annual Program Review Meeting", vol. II, "Advanced Combustion Technologies for Gas Turbine Power Plants", Vandsburger et al., pp. 328–352, Oct., 1995.

"Proceedings of the Advanced Turbine Systems Annual Program Review Meeting", vol. II, "Combustion Modeling in Advanced Gas Turbine Systems", Smoot et al., pp. 353–370, Oct., 1995.

"Proceedings of the Advanced Turbine Systems Annual Program Review Meeting", vol. II, "Heat Transfer in a Two–Pass Internally Ribbed Turbine Blade Coolant Channel with Cylindrical Vortex Generators", Hibbs et al., pp. 371–390, Oct., 1995.

"Proceedings of the Advanced Turbine Systems Annual Program Review Meeting", vol. II, "Rotational Effects on Turbine–Blade Cooling", Govatzidakia et al., pp. 391–392, Oct., 1995.

"Proceedings of the Advanced Turbine Systems Annual Program Review Meeting", vol. II, The Role of Reactant Unmixedness, Strain rate, and Length Scale on Premixed Combustor Performance, Samuelsen et al., pp. 415–422, Oct. 1995.

"Proceedings of the Advanced Turbine Systems Annual Program Review Meeting", vol. II, "Advanced Multistage Turbine Blade Aerodynamics, Performance, Cooling, and Heat Transfer", Fleeter et al., pp. 410–414, Oct., 1995.

"Proceedings of the Advanced Turbine Systems Annual Program Review Meeting", vol. II, "Experimental and Computational Studies of Film Cooling With Compound Angle Injection", Goldstein et al., pp. 423–451, Oct., 1995.

"Proceedings of the Advanced Turbine Systems Annual Program Review Meeting", vol. II, "Compatibility of Gas Turbine Materials with Steam Cooling", Desai et al., pp. 452–464, Oct., 1995.

"Proceedings of the Advanced Turbine Systems Annual Program Review Meeting", vol. II, "Use of a Laser–Induced Fluorescence Thermal Imaging System for Film Cooling Heat Transfer Measurement", M. K. Chyu, pp. 465–473, Oct., 1995.

"Proceedings of the Advanced Turbine Systems Annual Program Review Meeting", vol. II, Effects of Geometry on Slot–Jet Film Cooling Performance, Hyams et al., pp. 474–496 Oct., 1995.

"Proceedings of the Advanced Turbine Systems Annual Program Review Meeting", vol. II, "Steam as Turbine Blade Coolant: Experimental Data Gerneration", Wilmsen et al., pp. 497–505, Oct., 1995.

"Proceedings of the Advanced Turbine Systems Annual Program Review Meeting", vol. II, "Combustion Chemical Vapor Deposited Coatings for Thermal Barrier Coatings Systems", Hampikian et al., pp. 506–515, Oct., 1995.

"Proceedings of the Advanced Turbine Systems Annual Program Review Meeting", vol. II, "Premixed Burner Experiments: Geometry, Mixing, and Flame Structure Issues", Gupta et al., pp. 516–528, Oct., 1995.

"Proceedings of the Advanced Turbine Systems Annual Program Review Meeting", vol. II, "Intercooler Flow Path for Gas Turbines: CFD Design and Experiments", Agrawal et al., pp. 529–538, Oct., 1995.

"Proceedings of the Advanced Turbine Systems Annual Program Review Meeting", vol. II, "Bond Strength and Stress Measurements in Thermal Barrier Coatings", Gell et al., pp. 539–549, Oct., 1995.

"Proceedings of the Advanced Turbine Systems Annual Program Review Meeting", vol. II, "Active Control of Combustion Instabilities in Low $NO_x$ Gas Turbines", Zinn et al., pp. 550–551., Oct., 1995.

"Proceedings of the Advanced Turbine Systems Annual Program Review Meeting", vol. II, "Combustion Instability Modeling and Analysis", Santoro et al., pp. 552–559, Oct., 1995.

"Proceedings of the Advanced Turbine Systems Annual Program Review Meeting", vol. II, "Flow and Heat Transfer in Gas Turbine Disk Cavities Subject to Nonuniform External Pressure Field", Roy et al., pp. 560–565, Oct., 1995.

"Proceedings of the Advanced Turbine Systems Annual Program Review Meeting", vol. II, "Heat Pipe Turbine Vane Cooling", Langston et al., pp. 566–572, Oct., 1995.

"Proceedings of the Advanced Turbine Systems Annual Program Review Meeting", vol. II, "Improved Modeling Techniques for Turbomachinery Flow Fields", Lakshminarayana et al., pp. 573–581, Oct., 1995.

"Proceedings of the Advanced Turbine Systems Annual Program Review Meeting", vol. II, "Advanced 3D Inverse Method for Designing Turbomachine Blades", T. Dang, p. 582, Oct., 1995.

"Proceedings of the Advanced Turbine Systems Annual Program Review Meeting", "ATS and the Industries of the Future", Denise Swink, p. 1, Nov., 1996.

"Proceedings of the Advanced Turbine Systems Annual Program Review Meeting", "Gas Turbine Association Agenda", William H. Day, pp. 3–16, Nov. 1996.

"Proceedings of the Advanced Turbine Systems Annual Program Review Meeting", "Power Needs in the Chemical Industry", Keith Davidson, pp. 17–26, Nov., 1996.

"Proceedings of the Advanced Turbine Systems Annual Program Review Meeting", "Advanced Turbine Systems Program Overview", David Esbeck, pp. 27–34, Nov. 1996.

"Proceedings of the Advanced Turbine Systems Annual Program Review Meeting", "Westinghouse's Advanced Turbine Systems Program", Gerard McQuiggan, pp. 35–48, Nov. 1996.

"Proceedings of the Advanced Turbine Systems Annual Program Review Meeting", "Overview of GE's H Gas Turbine Combined Cycle", Cook et al., pp. 49–72, Nov., 1996.

"Proceedings of the Advanced Turbine Systems Annual Program Review Meeting", "Allison Advanced Simple Cycle Gas Turbine System", William D. Weisbrod, pp. 73–94, Nov. 1996.

"Proceedings of the Advanced Turbine Systems Annual Program Review Meeting", "The AGTSR Industry–University Consortium", Lawrence P. Golan, pp. 95–110, Nov. 1996.

"Proceedings of the Advanced Turbine Systems Annual Program Review Meeting", "$NO_x$ CO Emissions Models for Gas–Fired Lean–Premixed Combustion Turbines", A. Mellor, pp. 111–122, Nov., 1996.

"Proceedings of the Advanced Turbine Systems Annual Program Review Meeting", "Methodologies for Active Mixing and Combustion Control", Uri Vandsburger, pp. 123–156, Nov., 1996.

"Proceedings of the Advanced Turbine Systems Annual Program Review Meeting", "Combustion Modeling in Advanced Gas Turbine Systems", Paul O. Hedman, pp. 157–180, Nov., 19967.

"Proceedings of the Advanced Turbine Systems Annual Program Review Meeting", "Manifold Methods for Methane Combustion", Stephen B. Pope, pp. 181–188, Nov., 1996.

"Proceedings of the Advanced Turbine Systems Annual Program Review Meeting", "The Role of Reactant Unmixedness, Strain Rate, and Length Scale on Premixed Combustor Performance", Scott Samuelsen, pp. 189–210, Nov., 1996.

"Proceedings of the Advanced Turbine Systems Annual Program Review Meeting", "Effect of Swirl and Momentum Distribution on Temperature Distribution in Premixed Flames", Ashwani K. Gupta, pp. 211–232, Nov., 1996.

"Proceedings of the Advanced Turbine Systems Annual Program Review Meeting", "Combustion Instability Studies Application to Land–Based Gas Turbine Combustors", Robert J. Santoro, pp. 233–252.

"Proceedings of the Advanced Turbine Systems Annual Program Review Meeting", "Active Control of Combustion Instabilities in Low $NO_x$ Turbines", Ben T. Zinn, pp. 253–264, Nov., 1996.

"Proceedings of the Advanced Turbine Systems Annual Program Review Meeting", "Life Prediction of Advanced Materials for Gas Turbine Application," Sam Y. Zamrik, pp. 265–274, Nov., 1996.

"Proceedings of the Advanced Turbine Systems Annual Program Review Meeting", "Combustion Chemical Vapor Deposited Coatings for Thermal Barrier Coating Systems", W. Brent Carter, pp. 275–290, Nov., 1996.

"Proceedings of the Advanced Turbine Systems Annual Program Review Meeting", "Compatibility of Gas Turbine Materials with Steam Cooling", Vimal Desai, pp. 291–314, Nov. 1996.

"Proceedings of the Advanced Turbine Systems Annual Program Review Meeting", "Bond Strength and Stress Measurements in Thermal Barrier Coatings", Maurice Gell, pp. 315–334, Nov. 1996.

"Proceedings of the Advanced Turbine Systems Annual Program Review Meeting", "Advanced Multistage Turbine Blade Aerodynamics, Performance, Cooling and Heat Transfer", Sanford Fleeter, pp. 335–356, Nov. 1996.

"Proceedings of the Advanced Turbine Systems Annual Program Review Meeting", "Flow Characteristics of an Intercooler System for Power Generating Gas Turbines", Ajay K. Agrawal, pp. 357–370, Nov., 1996.

"Proceedings of the Advanced Turbine Systems Annual Program Review Meeting", "Improved Modeling Techniques for Turbomachinery Flow Fields", B. Lakshiminarayana, pp. 371–392, Nov., 1996.

"Proceedings of the Advanced Turbine Systems Annual Program Review Meeting", "Development of an Advanced 3d & Viscous Aerodynamic Design Method for Turbomachine Components in Utility and Industrial Gas Turbine Applications", Thong Q. Dang, pp. 393–406, Nov., 1996.

"Proceedings of the Advanced Turbine Systems Annual Program Review Meeting", "Advanced Turbine Cooling Heat Transfer, and Aerodynamic Studies", Je–Chin Han, pp. 407–426, Nov., 1996.

"Proceedings of the Advanced Turbine Systems Annual Program Review Meeting", "Heat Transfer in a Two–Pass Internally Ribbed Turbine Blade Coolant Channel with Vortex Generators", S. Acharya, pp. 427–446.

"Proceedings of the Advanced Turbine Systems Annual Program Review Meeting", "Experimental and Computational Studies of Film Cooling with Compound Angle Injection", R. Goldstein, pp. 447–460, Nov., 1996.

"Proceedings of the Advanced Turbine Systems Annual Program Review Meeting", "Steam as a Turbine Blade Coolant: External Side Heat Transfer", Abraham Engeda, pp. 471–482, Nov., 1996.

"Proceedings of the Advanced Turbine Systems Annual Program Review Meeting", "Flow and Heat Transfer in Gas Turbine Disk Cavities Subject ot Nonuniform External Pressure Field", Ramendra Roy, pp. 483–498, Nov., 1996.

"Proceedings of the Advanced Turbine Systems Annual Program Review Meeting", "Closed–Loop Mist/Steam Cooling for Advanced Turbine Systems", Ting Wang, pp. 499–512, Nov., 1996.

"Proceedings of the Advanced Turbine Systems Annual Program Review Meeting", "EPRI's Combustion Turbine Program: Status and Future Directions", Arthur Cohn, pp. 535–552 Nov., 1996.

"Proceedings of the Advanced Turbine Systems Annual Program Review Meeting", "ATS Materials Support", Michael Krnitz, pp. 553–576, Nov., 1996.

"Proceedings of the Advanced Turbine Systems Annual Program Review Meeting", "Turbine Airfoil Manufacturing Technology", Charles S. Kortovich, pp. 593–622, Nov. 1996.

"Proceedings of the Advanced Turbine Systems Annual Program Review Meeting", "Land Based Turbine Casting Initiative", Boyd A. Mueller, pp. 577–592, Nov., 1996.

"Proceedings of the Advanced Turbine Systems Annual Program Review Meeting", "Hot Corrosion Testing of TBS's", Norman Bornstein, pp. 623–631, Nov., 1996.

"Proceedings of the Advanced Turbine Systems Annual Program Review Meeting", "Ceramic Stationary Gas Turbine", Mark van Roode, pp. 633–658, Nov., 1996.

"Proceedings of the Advanced Turbine Systems Annual Program Review Meeting", "Western European Status of Ceramics for Gas Turbines", Tibor Bornemisza, pp. 659–670, Nov., 1996.

"Proceedings of the Advanced Turbine Systems Annual Program Review Meeting", "Status of Ceramic Gas Turbines in Russia", Mark van Roode, p. 671, Nov., 1996.

Status Report: "The U.S. Department of Energy's Advanced Turbine systems Program", facsimile dated Nov. 7, 1996.

"Testing Program Results Validate GE's H Gas Turbine –High Efficiency, Low Cost of Electricity and Low Emissions", Roger Schonewald and Patrick Marolda, (no date available).

"Testing Program Results Validate GE's H Gas Turbine –High Efficiency, Low Cost of Electricity and Low Emissions", Slide Presentation –working draft, (no date available).

"The Next Step In H. . . For Low Cost Per kW–Hour Power Generation", LP–1 PGE '98.

"Utility Advanced Turbine System (ATS) Technology Readiness Testing and Pre–Commercialization Demonstration", Document #486040, Oct. 1–Dec. 31, 1996, Publication Date, Jun. 1, 1997, Report Nos. DOE/MC/31176—5628.

"Utility Advanced Turbine System (ATS) Technology Readiness Testing —Phase 3", Document #666274, Oct. 1, 1996–Sep. 30, 1997, Publication Date, Dec. 31, 1997, Report Nos.: DOE/MC/31176—10.

"Utility Advanced Turbine System (ATS) Technology Readiness Testing and Pre–Commercial Demonstration, Phase 3", Document #486029, Oct. 1–Dec. 31, 1995, Publication Date, May 1, 1997, Report Nos.: DOE/MC/31176—5340.

"Utility Advanced Turbine System (ATS) Technology Readiness Testing and Pre–Commercial Demonstration –Phase 3", Document #486132, Apr. 1–Jun. 30, 1976, Publication Date, Dec. 31, 1996, Report Nos.: DOE/MC/31176—5660.

"Utility Advanced Turbine System (ATS) Technology Readiness Testing and Pre–Commercial Demonstration—Phase 3", Document #587906, Jul. 1–Sep. 30, 1995, Publication Date, Dec. 31, 1995, Report Numbers: DOE/MC/31176—5339.

"Utility Advanced Turbine System (ATS) Technology Readiness Testing and Pre–Commercial Demonstration" Document #666277, Apr. 1 –Jun. 30, 1997, Publication Date, Dec. 31, 1997, Report Nos.: DOE/MC/31176—8.

"Utility Advanced Turbine System (ATS) Technology Readiness Testing and Pre–Commercialization Demonstration" Jan. 1–Mar. 31, 1996, DOE/MC/31176—5338.

"Utility Advanced Turbine System (ATS) Technology Readiness Testing: Phase 3R", Document #756552, Apr. 1–Jun. 30, 1999, Publication Date, Sep. 1, 1999, Report Nos.: DE—FC21–95MC31176–23.

"Utility Advanced Turbine System (ATS) Technology Readiness Testing.", Document #656823, Jan. 1–Mar. 31, 1998, Publication Date, Aug. 1, 1998, Report Nos.: DOE/MC/31176–17.

"Utility Advanced Turbine Systems (ATS) Technology Readiness Testing and Pre–Commercial Demonstration", Annual Technical Progress Report, Reporting Period: Jul. 1, 1995–Sep. 30, 1996.

"Utility Advanced Turbine Systems (ATS) Technology Readiness Testing", Phase 3R, Annual Technical Progress Report, Reporting Period: Oct. 1, 1997–Sept. 30, 1998.

"Utility Advanced Turbine Systems (ATS) Technology Readiness Testing", Document #750405, Oct. 1–Dec. 30, 1998, Publication Date: May 1, 1999, Report Nos.: DE–FC21–95MC31176–20.

"Utility Advanced Turbine Systems (ATS) Technology Readiness Testing", Document #1348, Apr. 1–Jun. 29, 1998, Publication Date Oct. 29, 1998, Report Nos. DE–FC21–95MC31176—18.

"Utility Advanced Turbine Systems (ATS) Technology Readiness Testing–Phase 3", Annual Technical Progress Report, Reporting Period: Oct. 1, 1996–Sep. 30, 1997.

"Utility Advanced Turbine Systems (ATS) Technology Readiness Testing and Pre–Commercial Demonstration", Quarterly Report, Jan. 1–Mar. 31, 1997, Document #666275, Report Nos.: DOE/MC/31176–07.

"Proceedings of the 1997 Advanced Turbine Systems", Annual Program Review Meeting, Oct. 28–29, 1997.

"Proceedings of the Advanced Turbine Systems Annual Program Review Meeting", "Study of Endwall Film Cooling with a Gap Leakage Using a Thermographic Phosphor Fluorescence Imaging System", Mingking K. Chyu, pp. 461–470, Nov. 1996.

"Proceedings of the Advanced Turbine Systems Annual Program Review Meeting", "Heat Pipe Turbine Vane Cooling", Langston et al., pp. 513–534, Nov. 1996.

"Proceedings of the Advanced Turbine Systems Annual Program Review Meeting", "Land Based Turbine Casting Initiative", Boyd A. Mueller, pp. 577–592. Nov. 1996.

* cited by examiner

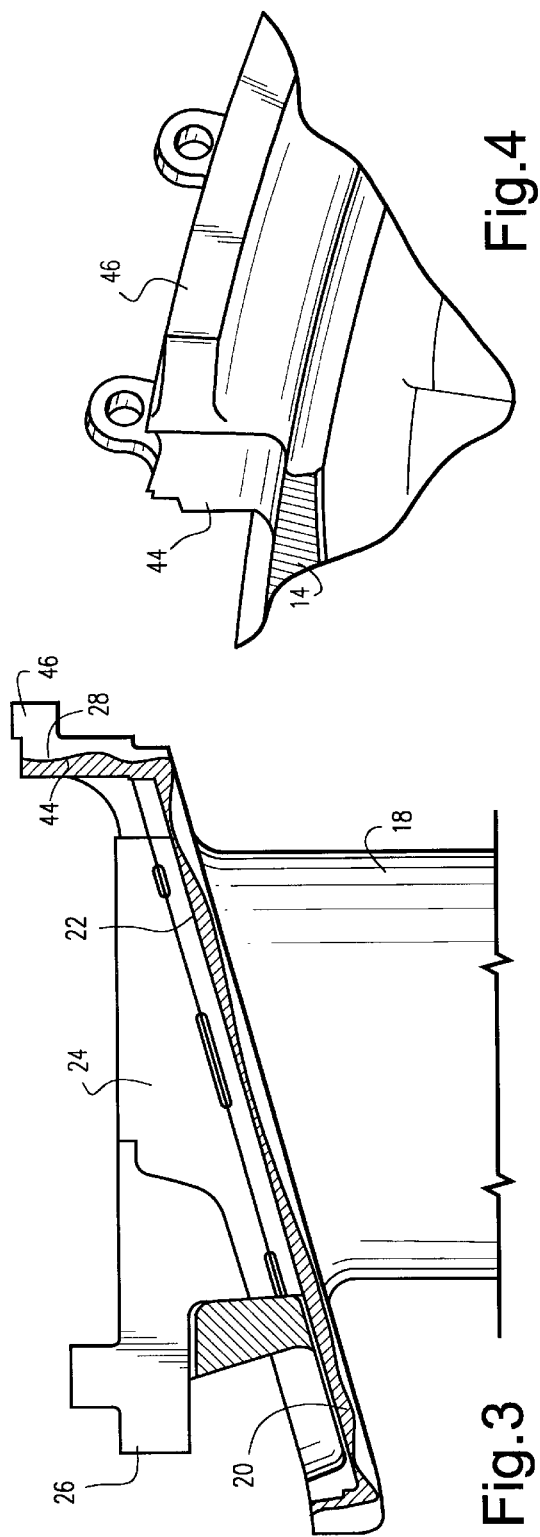
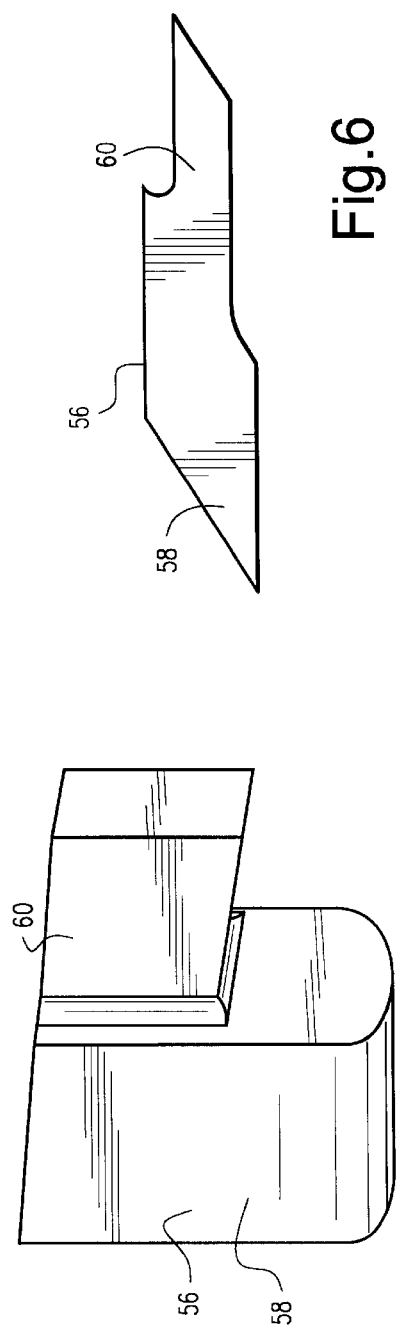

STATOR VANE ASSEMBLY FOR A TURBINE AND METHOD FOR FORMING THE ASSEMBLY

BACKGROUND OF THE INVENTION

The present invention relates to turbines, e.g., gas turbines, and particularly to apparatus and methods for welding turbine vane segments one to the other to form an annular array of segments forming a turbine stage.

In the construction of turbines, particularly gas turbines, an annular array of turbine segments is provided to form a turbine stage. Generally, the turbine stage includes outer and inner annular bands spaced radially one from the other with a plurality of vanes extending between the outer and inner bands at circumferentially spaced positions one from the other. It will be appreciated that the outer and inner bands and the vanes define a path for the working fluid flowing through the turbine, e.g., a hot gas path in the case of a gas turbine. In a more recent advanced gas turbine design, the hot gas path is cooled by flowing steam along walls of the outer and inner bands and through the vanes. For various reasons, including the complexities of cooling a gas turbine with steam, the nozzle stages are formed of discrete segments or singlets. Each singlet or vane segment, because of the airfoil shape of the vanes, includes forward, generally axially extending outer and inner band portions, and aft outer and inner band portions which extend both axially and circumferentially, i.e., angled in an aft direction relative to the axis of the rotor and relative to the forward portions of the segment.

The singlets are preferably welded together along adjoining margins of the outer and inner bands. However, the materials forming the outer and inner bands are necessarily designed for high strength and resistance to the high temperatures of the hot gas path. The inner and outer bands are therefore not readily welded to one another because of their necessary chemistry, conditioning and configuration. While tungsten inert gas (TIG) welding techniques are common, they are characterized by uneven heat input to the weld, resulting in significant warpage and distortion of the parts welded to one another. The filler material must also characteristically match the material of the outer and inner bands. Accordingly, a stator vane assembly and method of forming the assembly are required which eliminate or minimize any distortion in the welds and which provide a high strength joint.

BRIEF SUMMARY OF THE INVENTION

In accordance with a preferred embodiment of the present invention, the adjacent margins of the outer and inner bands of adjoining stator vane segments are provided with generally radially outwardly and inwardly directed flanges, respectively. Chamfers are also formed along their adjoining edges on the hot gas path sides. By employing E-beam welding, the material of the margins, i.e., the flanges, are fused one to the other using the parent material and without the addition of high heat inputs characteristic of other welding techniques such as TIG welding. The resulting weld is without significant distortion or warp and has significantly fewer defects than TIG welds. While E-beam welding is not the most cost-effective type of welding, e.g., it must be performed in a vacuum, it has the advantage of significantly eliminating or minimizing distortion or warpage because of its reduced heat input. By fusing the margins of the outer and inner bands to one another by E-beam welding with the E-beam directed from outside of the outer and inner bands, it will be appreciated that the parent material may spatter weld material on the gas path side and form an irregular surface. Consequently, chamfers are provided on the margins of the outer and inner bands along the hot gas path sides thereof such that, subsequent to welding the outer and inner margins together using E-beam welding, the interior chamfers are TIG-welded. The weld material added to the mating chamfers and the higher heat input relative to E-beam welding does not affect the joint because the weld area is significantly smaller than welding the entirety of the margins to one another. The weld material applied along the chamfered surfaces of the outer and inner bands by TIG-welding can be machined to form a smooth, continuous gas path surface along the hot gas path side of the outer and inner bands.

At the aft end of the outer band of each segment, there is provided an aft hook for securing the nozzle stage to the fixed casing of the turbine. The aft hook comprises a radially outwardly directed flange and a flange which projects in an aft direction from the radial flange. These flanges change the thickness of the material forming the margins of the outer band at the aft hook. E-beam welding requires a constant energy input and the material being welded should have a constant cross-sectional geometry to effect a uniform weld. The aft hook changes that geometry and therefore the aft hooks of the adjoining segments are not suitable for welding using solely an E-beam. To accommodate the change in material thickness, and still provide a high-strength weld without distortion or warpage, the adjoining ends of the aft hook at the juncture of the vane segments are cut back to provide angled faces spaced circumferentially one from the other and inset in a circumferential direction from the segment margin. A filler piece is provided for disposition in the slot thus formed between the inset faces of the aft hook portions of the vane segments. The filler piece has a reduced thickness tongue projecting in the same angled direction as the aft projecting flange. The cutout or slot in the adjoining aft hook segments are provided with a larger spacing between the inset faces of the aft projecting flange than between the inset faces of the radial projecting flange. Hence, the reduced tongue of the filler piece provides gaps between it and the inset faces of the aft projecting flanges of the adjoining segments. The body of the filler piece is preferably E-beam welded to the radial projecting flange faces and TIG-welded to the aft projecting flange faces. Weld material is therefore supplied in the gaps between the tongue and the inset faces of the aft projecting flange. By employing these welding techniques at the various locations of the adjoining segments, the individual vane segments are joined one to the other without substantial warpage or distortion.

In a preferred embodiment according to the present invention, there is provided a method of welding first and second stator vane segments to one another wherein each segment includes an outer band, an inner band and a vane extending between the bands comprising the steps of welding adjacent margins of the inner and outer bands of the first and second segments to one another from outside the bands without using weld filler material and welding the adjacent margins to one another along inside surfaces of the bands using weld filler material.

In a further preferred embodiment according to the present invention, there is provided a method of welding first and second stator vane segments to one another wherein each segment includes an outer band, an inner band and a vane extending between the bands comprising the steps of welding adjacent margins of the inner and outer bands of the first and second segments to one another, providing an opening along aft hooks of the outer bands defining opposed setback faces, inserting a filler piece in the opening spaced from the setback faces and welding the filler piece to the aft hooks.

In a still further preferred embodiment according to the present invention, there is provided a stator vane assembly for a turbine comprising first and second stator vane segments each including an outer band, an inner band and a vane extending between the outer band and the inner band, the outer and inner bands of the first segment having respective first margins welded to second margins of the outer and inner bands, respectively, of the second segment whereby the first and second segments are secured to one another to define a flow path between adjoining vanes and the inner and outer bands of the segments, each of the segments having an aft hook along an aft edge of the outer band thereof and having a generally radially extending flange and an aft projecting flange, the flanges of the aft hooks being set back from respective first and second margins of the segments forming setback faces defining an opening between the flanges, a filler piece in the opening defining gaps on opposite sides thereof with the setback faces of the aft projecting flanges and weld material in the gaps securing the filler piece and the aft projecting flanges to one another.

BRIEF DESCRIPTION OF THE DRAWINGS

FIG. 3 is a fragmentary circumferential cross-sectional view illustrating the outer band and vane of one of the segments;

FIG. 4 is an enlarged fragmentary view illustrating the aft hook of the outer band;

FIG. 5 is an enlarged perspective view of the weld filler piece;

FIG. 6 is a plan view looking radially of the filler piece;

DETAILED DESCRIPTION OF THE INVENTION

Figure 1:
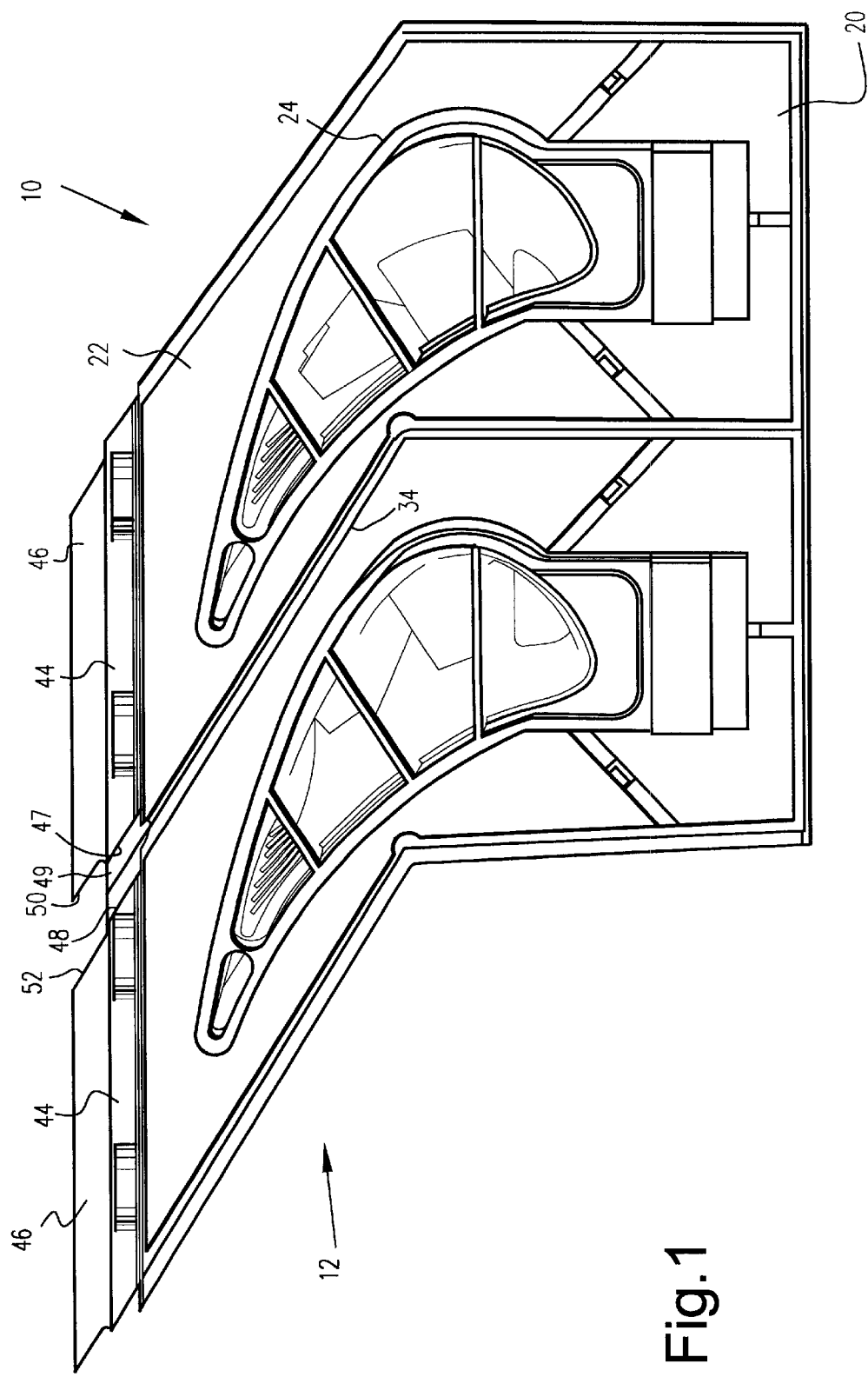
FIG. 1 is a radially inward plan view of the outer band portions of a pair of singlets welded together in accordance with a preferred embodiment of the present invention.
Figure 2:
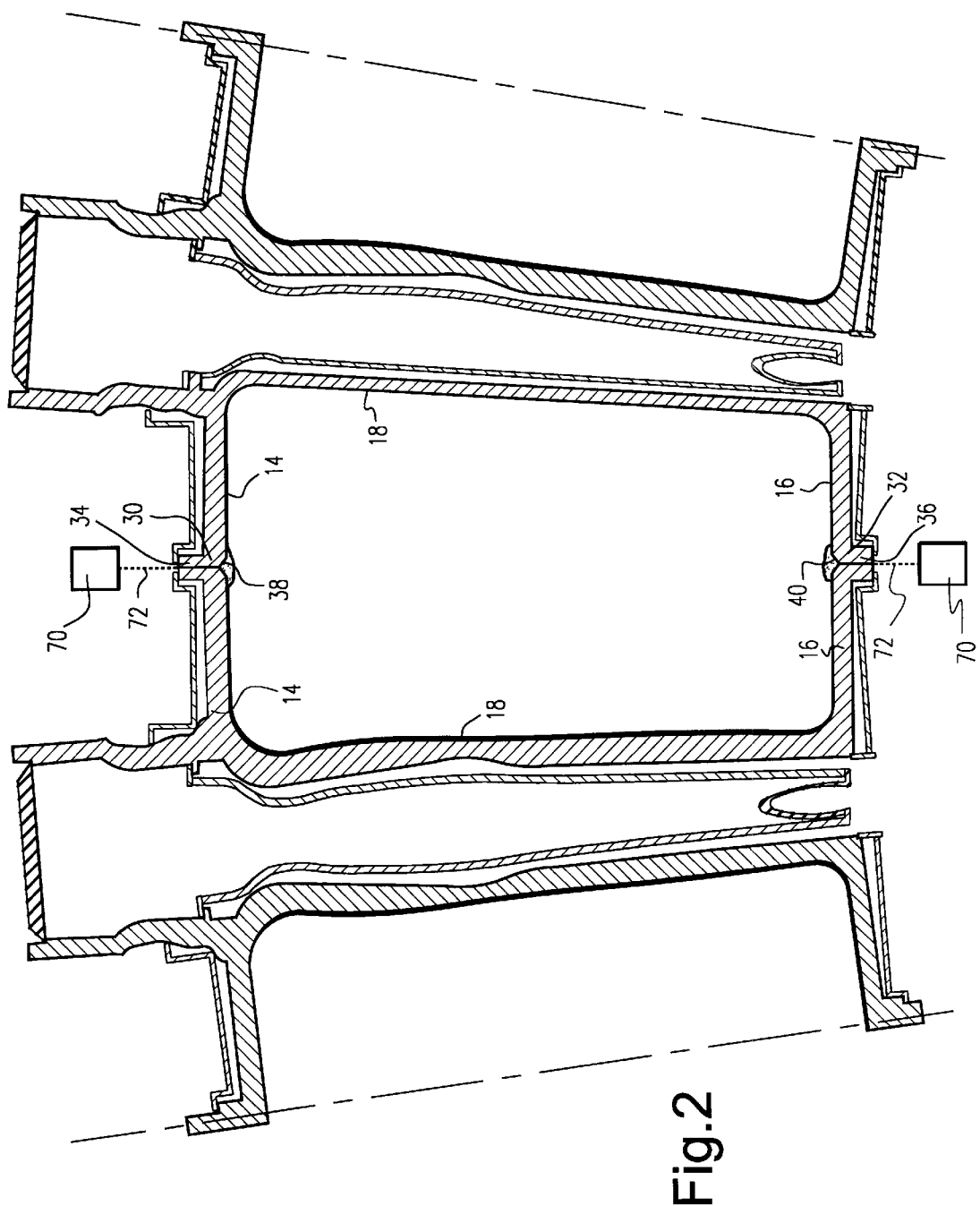
FIG. 2 is an axial cross-sectional view of the vane assembly of FIG. 1.

Referring now to the drawing figures, particularly to FIGS. 1 and 2, there is illustrated a pair of stator vane segments 10 and 12 forming a part of an annular array of stator vane segments forming a nozzle stage of a turbine, e.g., a gas turbine. Particularly, each segment 10 and 12 comprises an outer band 14, an inner band 16 and a vane 18 interconnecting the outer and inner bands 14 and 16, respectively. Each of the outer and inner bands comprises a forward section 20 extending in an axial direction and an aft section 22 extending at an angle to the axial direction. It will be appreciated that the vane 18 extending between the outer and inner bands 14 and 16, respectively, also includes a vane extension 24 projecting radially outwardly of the outer band 14. The vane extensions facilitate structural support for the segments from the fixed portion of the turbine casing, not shown, and also facilitate cooling of the outer and inner bands and vanes, both in a manner not pertinent to the present invention. The vane extensions 24 illustrate to a significant extent the cross-sections of the vanes, which necessitates the angled aft portions 22 of the segments. Referring to FIG. 3, the forward portion 20 of the outer band of each vane segment includes a forward hook 26, while the aft section 22 of the outer band 14 includes an aft hook 28. The forward and aft hooks 26 and 28 secure the vane segments and the stage formed by the segments to the fixed casing of the turbine, not shown.

As illustrated in FIG. 2, each of the outer and inner bands 14 and 16, respectively, include a margin 30 and 32 having respective radially outwardly and inwardly directed flanges 34 and 36. The margins 30 and 32 are also provided with chamfers 38 and 40 along the interior sides of the outer and inner bands 14 and 16, i.e., along the gas path side of the bands.

As illustrated in FIGS. 1, 3 and 4, the aft hook 28 on each vane segment includes a generally radially outwardly projecting flange 44 and an axially extending flange 46 at the distal end of the radial flange 44. Each segment 10 and 12 has a cutout along the adjoining aft hooks whereby the aft hooks of the respective segments are circumferentially spaced one from the other. More particularly, the upstanding radial flange 44 is cut back from the margin 30 of the outer band 14 to form an inset or setback face 47. The adjoining segment 12 has a similar setback face 48. The setback faces 47 and 48 form a seat 49 along the adjoining outer bands 14 in the region of the radial flange 44. The axially extending flange 46 of segment 10 also has a cutback face 50, while the flange 46 of segment 12 similarly has a cutback face 52. The inset or cutback faces 50 and 52 are spaced in a circumferential direction one from the other a distance greater than the inset or setback faces 47 and 48 are spaced one from the other.

Figure 7:
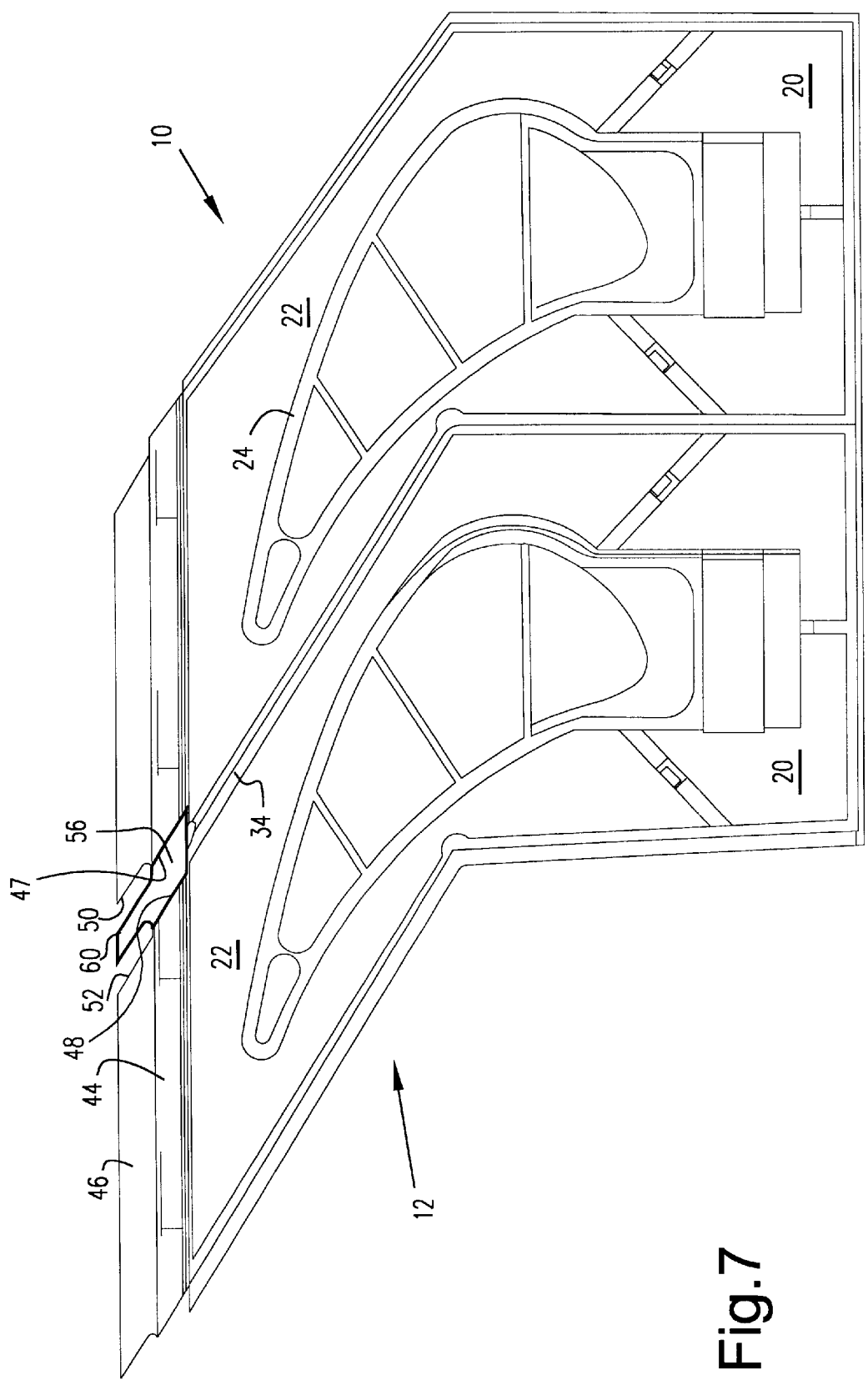
FIG. 7 is a view similar to FIG. 1 illustrating the vane segments adjacent one another with the filler piece inserted prior to TIG-welding.

Referring to FIGS. 5 and 6, there is illustrated a filler piece 56 having a main body 58 and a tongue 60. The main body 58 is received in the seat 49 formed by the margins of the outer walls and defined by the inset faces 47 and 48 in a closely toleranced fit enabling E-beam welding of the main body 58 to the upstanding flanges 44 of the adjoining segments. That is, the side faces of the main body 58 of filler piece 56 are E-beam welded to the inset faces 47 and 48 of the radial flanges 44 of the adjoining segments. As illustrated in FIG. 7, the sides faces of the tongue 60 of the filler piece 56 project parallel to the inset faces 50 and 52 and thereby form gaps with the faces 50 and 52 of the axial flanges 46. The faces 50 and 52 form respective acute and obtuse angles with the distal edge of the aft flanges of the segments.

To secure the vane segments one to the other, the margins of the inner and outer bands 14 and 16 of the adjoining segments are welded one to the other using an E-beam schematically illustrated at 70 and 72. Thus, the E-beam, which does not require filler material, fuses the flanges 34 and 36 of the adjoining segments to one another using the parent material of the segments. The flanges are thus fused to one another along the forward and aft sections 20 and 22 of the adjoining outer bands and along similar sections of the adjoining inner bands. The adjoining chamfered surfaces 38 and 40 are thereafter TIG-welded one to the other on the hot gas path sides of the outer and inner bands. That is, filler material is provided along the adjoining chamfers 38 and 40 as illustrated in FIG. 2. The welds, of course, are subsequently machined to provide a smooth continuous surface along the outer and inner bands on the hot gas path side.

Figure 8:
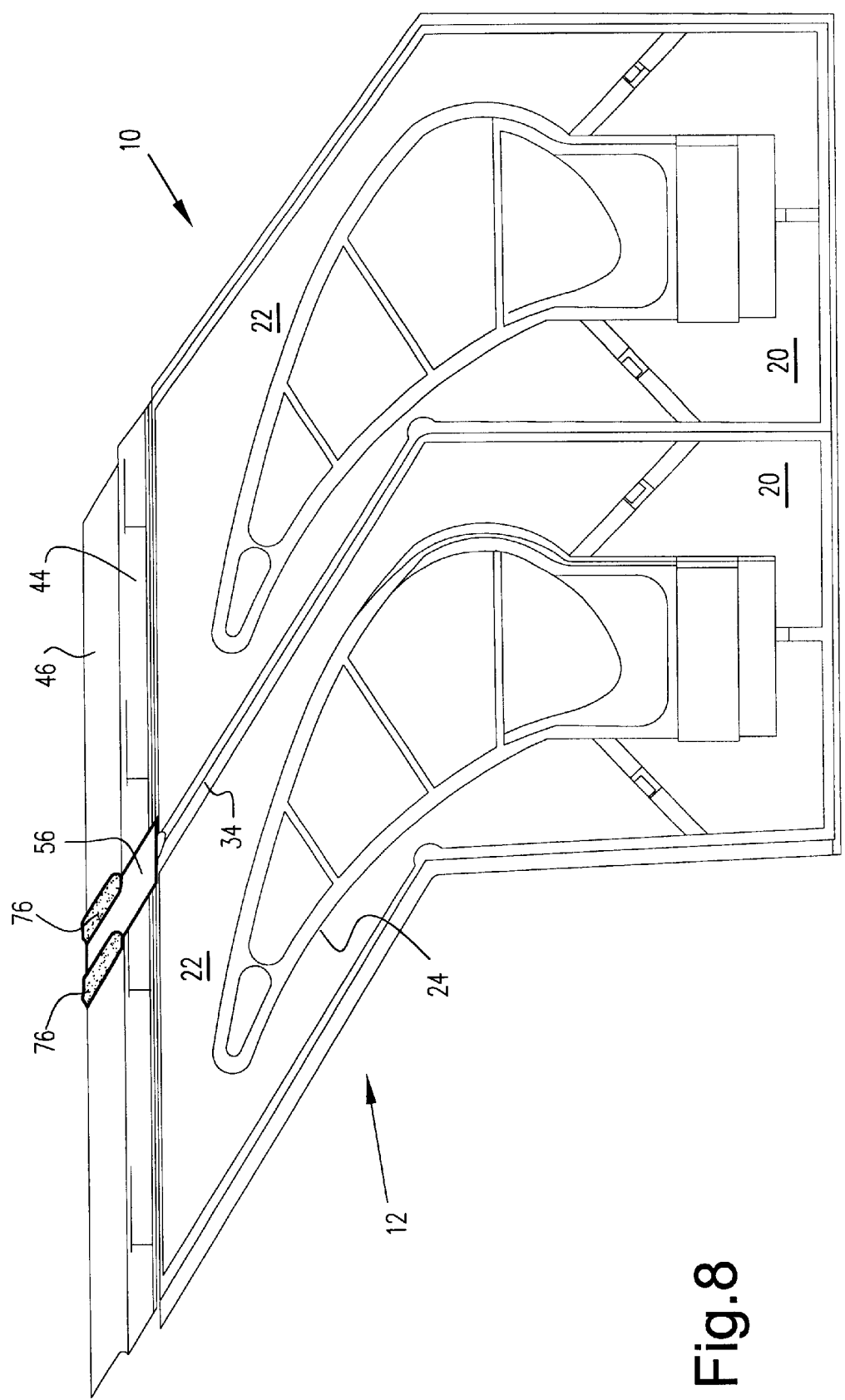
FIG. 8 is a view similar to FIG. 7 illustrating the TIG-welding of the filler piece at the aft hook prior to machining.

The sides of the body 58 of the filler piece 56 are likewise E-beam welded to the faces 47 and 48 of the upstanding flanges 44. However, the tongue 60 of the filler piece 56 and the inset faces 50 and 52 of the axially directed flanges 46 of the adjoining segments are TIG-welded one to the other. Thus, as illustrated in FIG. 8, filler material 76 is provided in the gaps between the registering side faces of the tongue 60 and the inset faces 50 and 52, respectively, of the aft flanges 46. The filler material is, of course, subsequently machined to form continuous smooth surfaces.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of welding first and second stator vane segments to one another wherein each segment includes an outer band, an inner band and a vane extending between the bands comprising the steps of:

welding adjacent margins of said inner and outer bands of said first and second segments to one another from outside said bands without using weld filler material; and welding said adjacent margins to one another along inside surfaces of said bands using weld filler material.

2. A method according to claim 1 including providing an opening along aft hooks of said outer bands defining opposed setback faces, inserting a filler piece in said opening spaced from said setback faces and welding said filler piece to said aft hooks using weld filler material.

3. A method according to claim 1 including welding said adjacent margins to one another from outside said bands by fusing solely parent material of the bands to one another, forming chamfers along inside surfaces of said outer and inner bands defining said margins and TIG-welding the adjacent margins along inside surfaces of said band using weld filler material filling said chamfers.

4. A method according to claim 1 wherein aft hooks are provided on the outer bands including radial flanges and axial flanges extending from said radial flanges and including providing an opening along said adjoining aft hooks of said outer bands defining opposed setback faces along said radial flanges, inserting a filler piece in said opening, welding said filler piece to the setback faces of said radial flanges by fusing parent material of said filler piece and said flanges and without using filler material, and welding said filler piece to the setback faces of said axial flanges using weld filler material.

5. A method of welding first and second stator vane segments to one another wherein each segment includes an outer band, an inner band and a vane extending between the bands comprising the steps of:

welding adjacent margins of said inner and outer bands of said first and second segments to one another;

providing an opening along aft hooks of said outer bands defining opposed setback faces;

inserting a filler piece in said opening spaced from said setback faces; and welding said filler piece to said aft hooks.

6. A method according to claim 5 including welding said adjacent margins to one another from outside said bands by fusing solely parent material of the bands to one another;

forming chamfers along inside surfaces of said outer and inner bands defining said margins and TIG-welding the adjacent margins along inside surfaces of said band using weld filler material filling said chamfers.

7. A method according to claim 5 wherein said aft hooks include radial flanges and axial flanges extending from said radial flanges and including the step of providing an opening along said adjoining aft hooks including said radial and axial flanges to define opposed setback faces along said radial and axial flanges, inserting a filler piece in said opening, welding said filler piece to the setback faces of said radial flanges by fusing parent material of said filler piece and said flanges and without using filler material, and welding said filler piece to the setback faces of said axial flanges using weld filler material.

* * * * *

UNITED STATES PATENT AND TRADEMARK OFFICE
CERTIFICATE OF CORRECTION

| | | |
|---|---|---|
| PATENT NO. | : 6,553,665 B2 | Page 1 of 1 |
| APPLICATION NO. | : 09/520459 | |
| DATED | : April 29, 2003 | |
| INVENTOR(S) | : Gunn et al. | |

It is certified that error appears in the above-identified patent and that said Letters Patent is hereby corrected as shown below:

In Column 1, below the title, insert:

--The Government of the United States of America has rights in this invention pursuant to Contract No. DE-FC21-95MC31176 awarded by the U. S. Department of Energy.--

Signed and Sealed this

Twentieth Day of February, 2007

JON W. DUDAS
*Director of the United States Patent and Trademark Office*